(12) United States Patent
Venkatesh

(10) Patent No.: US 9,143,562 B2
(45) Date of Patent: Sep. 22, 2015

(54) MANAGING TRANSFER OF DATA FROM A SOURCE TO A DESTINATION MACHINE CLUSTER

(75) Inventor: Rajat Venkatesh, Billerica, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 13/458,885

(22) Filed: Apr. 27, 2012

(65) Prior Publication Data

US 2013/0290471 A1 Oct. 31, 2013

(51) Int. Cl.
*G06F 15/167* (2006.01)
*H04L 29/08* (2006.01)

(52) U.S. Cl.
CPC ............ *H04L 67/1095* (2013.01); *H04L 67/28* (2013.01)

(58) Field of Classification Search
None
See application file for complete search history.

(56) References Cited

U.S. PATENT DOCUMENTS

| | | | | |
|---|---|---|---|---|
| 5,910,179 A * | 6/1999 | Mohseni | | 709/252 |
| 5,936,939 A * | 8/1999 | Des Jardins et al. | | 370/229 |
| 5,999,981 A * | 12/1999 | Willenz et al. | | 709/238 |
| 6,067,300 A * | 5/2000 | Baumert et al. | | 370/413 |
| 6,118,791 A * | 9/2000 | Fichou et al. | | 370/468 |
| 6,418,477 B1 * | 7/2002 | Verma | | 709/240 |
| 6,681,262 B1 * | 1/2004 | Rimmer | | 709/250 |
| 7,155,538 B1 * | 12/2006 | Rossello et al. | | 709/249 |
| 7,359,985 B2 * | 4/2008 | Grove et al. | | 709/238 |
| 7,420,923 B2 * | 9/2008 | Helgesen | | 370/238 |
| 7,627,549 B1 * | 12/2009 | Hiltunen et al. | | 1/1 |
| 7,729,273 B2 * | 6/2010 | Knapik et al. | | 370/252 |
| 8,432,831 B2 * | 4/2013 | Jung et al. | | 370/254 |
| 2002/0009066 A1 * | 1/2002 | Shimizu et al. | | 370/338 |
| 2003/0204623 A1 * | 10/2003 | Cain | | 709/241 |
| 2003/0204625 A1 * | 10/2003 | Cain | | 709/243 |
| 2009/0043750 A1 * | 2/2009 | Barsness et al. | | 707/5 |

* cited by examiner

*Primary Examiner* — Brian P Whipple

(74) *Attorney, Agent, or Firm* — Mannava & Kang

(57) ABSTRACT

In a method for managing transfer of data from a source machine cluster to a destination machine cluster, information relevant to the transfer of data from the source machine cluster to the destination machine cluster is accessed. In addition, a data transfer operation that substantially optimizes the transfer of the data based upon the accessed information is determined. Furthermore, the determined data transfer operation is implemented to transfer the data from the source machine cluster to the destination machine cluster.

14 Claims, 5 Drawing Sheets

MANAGING TRANSFER OF DATA FROM A SOURCE TO A DESTINATION MACHINE CLUSTER

BACKGROUND

Many types of data exist, such as unstructured, semi-structured, and structured. The various types of data are typically stored in multiple machines that run multiple and disparate types of database instances. Data contained in clusters of the machines are often replicated or transferred to other clusters for various reasons, for instance to reduce the number of copies of the data and to generate a set of data to be used for debugging or ad hoc analysis outside of a production system.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
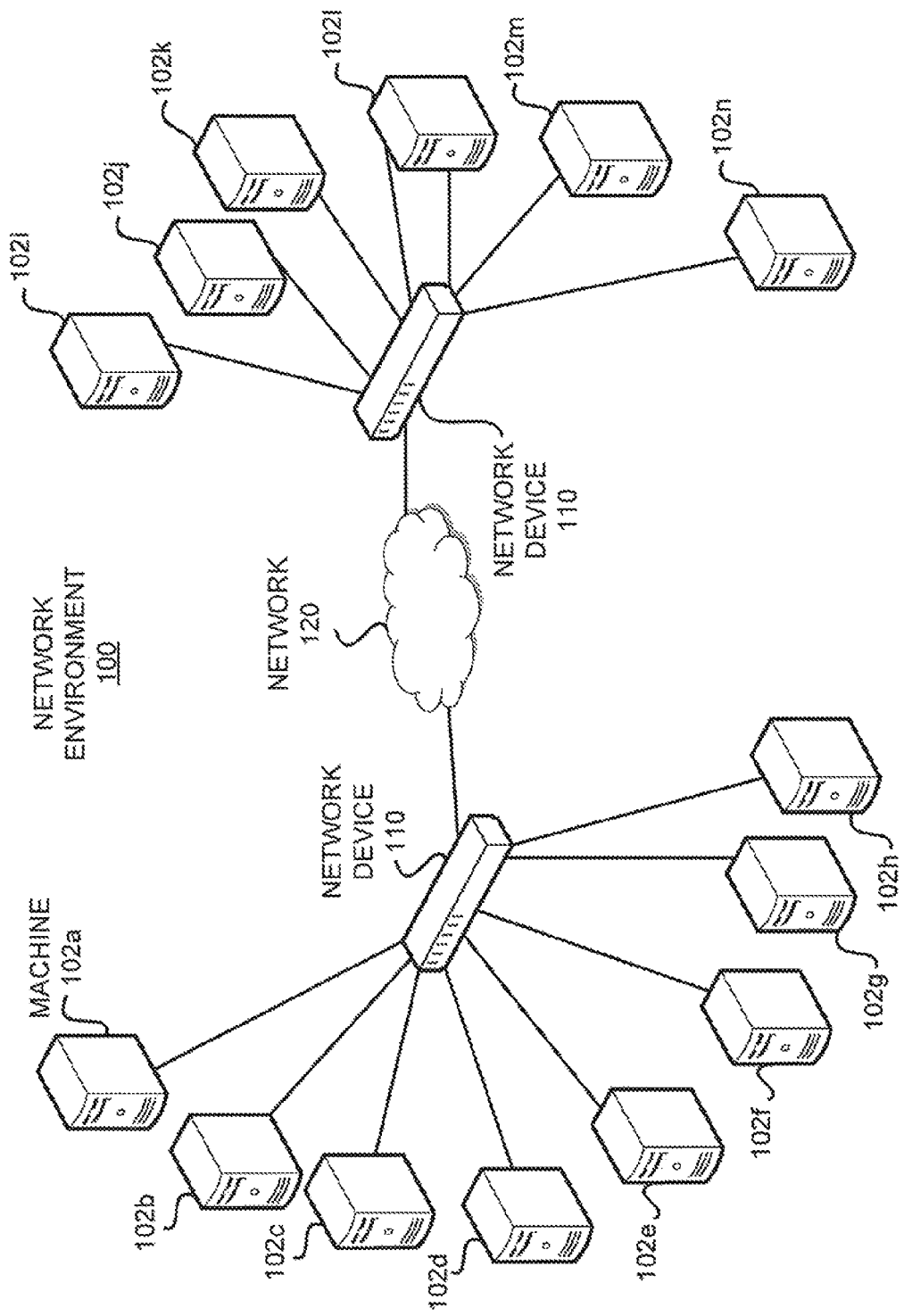
FIG. 1 shows a block diagram of a network environment, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

As used throughout the present disclosure, the terms "transfer" or "transferring" are intended to encompass both the transfer and deletion of data from a source machine as well as maintaining a copy of the transferred data in the source machine following the transfer of the data. As also used herein, the term "includes" means includes but not limited to, the term "including" means including but not limited to. The term "based on" means based at least in part on. In addition, the terms "a" and "an" are intended to denote at least one of a particular element.

Disclosed herein is a method for managing transfer of data from a source machine cluster to a destination machine cluster. Also disclosed herein are an apparatus for implementing the method and a non-transitory computer readable medium on which is stored machine readable instructions that implement the method.

As discussed in greater detail herein below, in the method, information relevant to the transfer of data from the source machine cluster to the destination machine cluster is accessed. In addition, a data transfer operation that substantially optimizes the transfer of the data based upon the accessed information is determined. Furthermore, the determined data transfer operation is implemented in transferring the data from the source machine cluster to the destination machine cluster. In various instances, the determined data transfer operation is implemented as the data is being transferred. By way of example, the data may be compressed as the data is being transferred. In other instances, the determined data transfer operation is implemented prior to the data being transferred. By way of example, the data may be re-ordered and/or partitioned in the source machines prior to being transferred.

Through implementation of various examples of the present disclosure, the transfer of the data may be managed to substantially optimize the transfer of the data. In one regard, the management of the transfer of the data may be performed at a time when the data is to be transferred, and therefore, the transfer of the data may substantially be optimized with respect to current information relevant to the transfer. Determination of the data transfer operation that substantially optimizes the transfer of the data at the time that the data is to be transferred using current information may be an improvement over known transfer techniques, which use generic information that is obtained a priori to transfer data.

With reference first to FIG. 1, there is shown a block diagram of a network environment 100, according to an example of the present disclosure. The network environment 100 is depicted as including a plurality of machines 102a-102n, network devices 110, and a network 120. It should be understood that the network environment 100 may include additional components and that one or more of the components described herein may be removed and/or modified without departing from a scope of the network environment 100. For instance, the network environment may include any number of machines 102a-102n and network devices 110.

The machines 102a-102n comprise servers or other apparatuses on which data is stored and that are able to transfer data between each other. According to another example, a machine 102a comprises a machine that manages the transfer of the data between other machines 102b-102n, without having the data stored on the machine 102a. The network devices 110 comprise any of, for instance, network switches, routers, hubs, etc., through which data between the machines 102a-102n may be transferred. In addition, or alternatively at least two of the machines 102a-102n may be directly connected to each other, i.e., without going through the network device 110. The network 120 represents an infrastructure through which the machines 102a-102n may communicate with each other. In this regard, the network 120 comprises any of; a local area network, a wide area network, the Internet, etc.

Various manners in which data stored, for instance, in a database, on at least one of the machines 102a-102n may be transferred to at least another one of the machines 102a-102n are described in greater detail herein below. Particularly, the transfer of the data may be managed in a manner that substantially optimizes the transfer of the data. The transfer of the data may be considered as being substantially optimized when at least one of, for instance, the amount of time required to transfer the data is substantially minimized, the number of copies of the data being transferred is substantially minimized, the consumption of network resources is substantially minimized, the use of the most efficient network resources is substantially maximized, etc. In addition, the transfer of the data may be considered to be substantially optimized when the transfer of the data is performed in a manner that is less than an optimized data transfer manner, for instance, in instances where the optimized data transfer manner is infeasible, violates a policy, etc. Thus, for instance, the transfer of the data may be considered to be substantially optimized when the transfer of the data is performed in a manner that is optimized with respect to any of a variety of constraints applicable on the transfer of the data.

Figure 2:
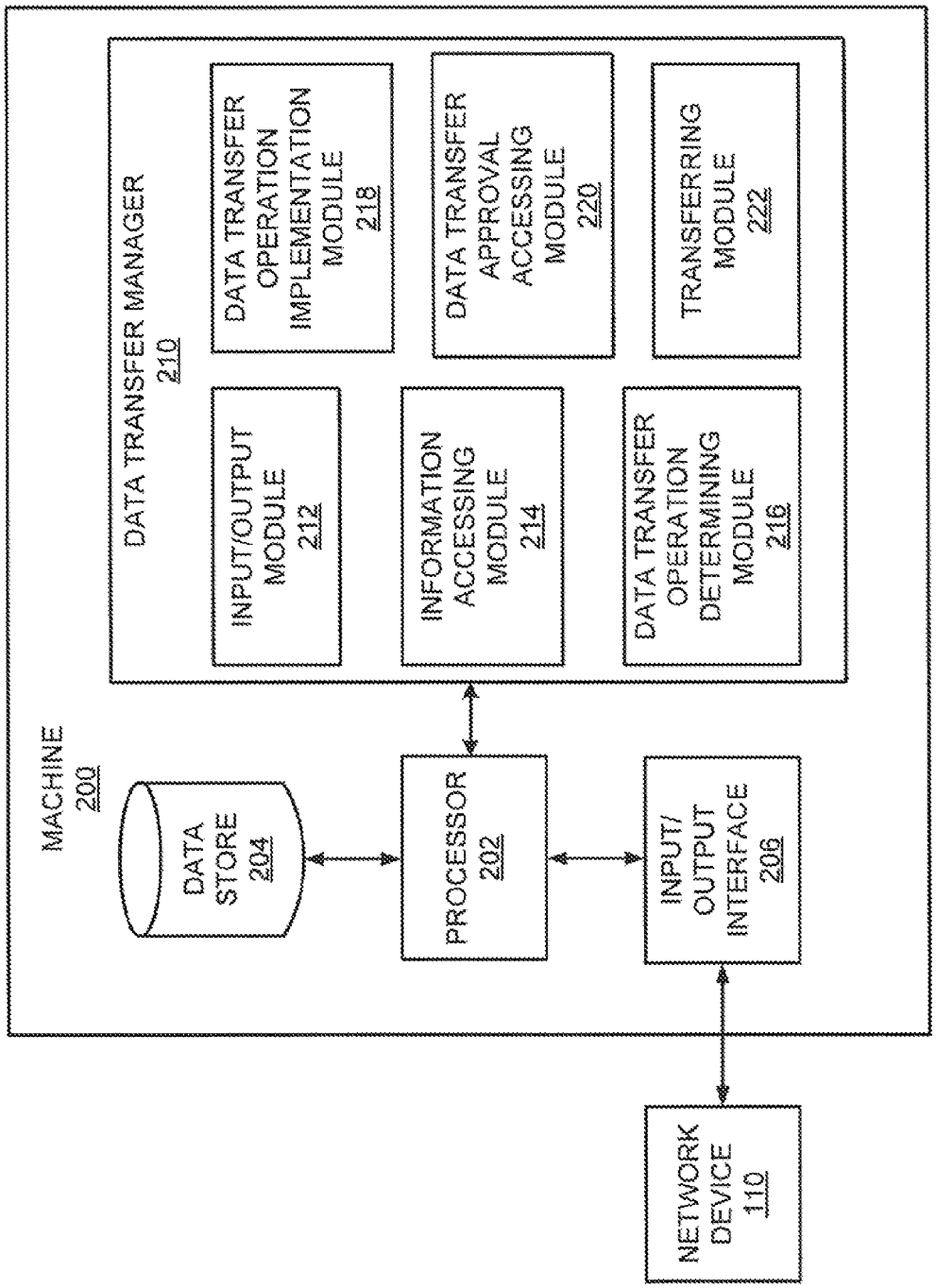
FIG. 2 shows a block diagram of a machine depicted in FIG. 1, according to an example of the present disclosure.

Turning now to FIG. 2, there is shown a block diagram of a machine 200 depicted in FIG. 1, according to an example of the present disclosure. The machine 200 generally represents any of the machines 102a-102n depicted in FIG. 1. It should be understood that the machine 200 may include additional components and that one or more of the components described herein may be removed and/or modified without departing from a scope of the machine 200.

The machine 200 is depicted as including a processor 202, a data store 204, an input/output interface 206, and a data transfer manager 210. The machine 200 comprises any of, for instance, a server, a computer, a laptop computer, a tablet computer, a personal digital assistant, a cellular telephone, or other electronic apparatus that is to perform a method for managing transfer of data disclosed herein. The machine 200 may therefore store the data that is to be transferred and/or may manage the transfer of data stored in other machines 102a-102n.

The data transfer manager 210 is depicted as including an input/output module 212, an information accessing module 214, a data transfer operation determining module 216, a data transfer operation implementation module 218, a data transfer approval accessing module 220, and a transferring module 222. The processor 202, which may comprise a microprocessor, a micro-controller, an application specific integrated circuit (ASIC), and the like, is to perform various processing functions in the machine 200. One of the processing functions includes invoking or implementing the modules 212-222 contained in the data transfer manager 210 as discussed in greater detail herein below.

According to an example, the data transfer manager 210 comprises a hardware device, such as a circuit or multiple circuits arranged on a board. In this example, the modules 212-222 comprise circuit components or individual circuits. According to another example, the data transfer manager 210 comprises a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In this example, the modules 212-222 comprise software modules stored in the data transfer manager 210. According to a further example, the modules 212-222 comprise a combination of hardware and software modules.

The input/output interface 206 may comprise a hardware and/or a software interface. In any regard, the input/output interface 206 may be connected to a network, such as the Internet, an intranet, etc., through the network device 110, over which the data transfer manager 210 may receive and communicate information, for instance, information relevant to the transfer of the data. The processor 202 may store information received through the input/output interface 206 in the data store 204 and may use the information in implementing the modules 212-222. The data store 204 comprises volatile and/or non-volatile memory, such as DRAM, EEPROM, MRAM, phase change RAM (PCRAM), Memristor, flash memory, and the like. In addition, or alternatively, the data store 204 comprises a device that is to read from and write to a removable media, such as a floppy disk, a CD-ROM, a DVD-ROM, or other optical or magnetic media.

Figure 3:
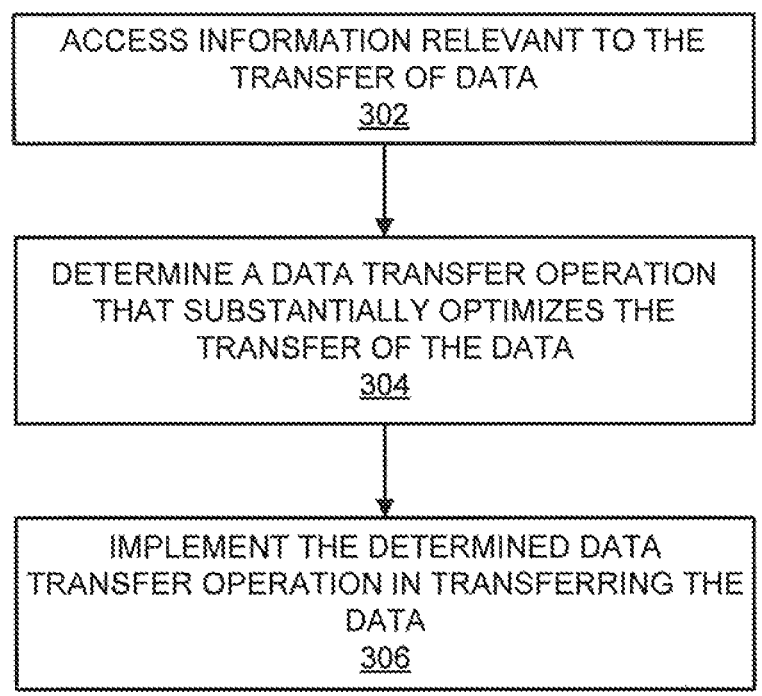
FIGS. 3 and 4, respectively, show flow diagrams of methods for managing transfer of data from a source machine cluster to a destination machine cluster, according to an example of the present disclosure.
Figure 4:
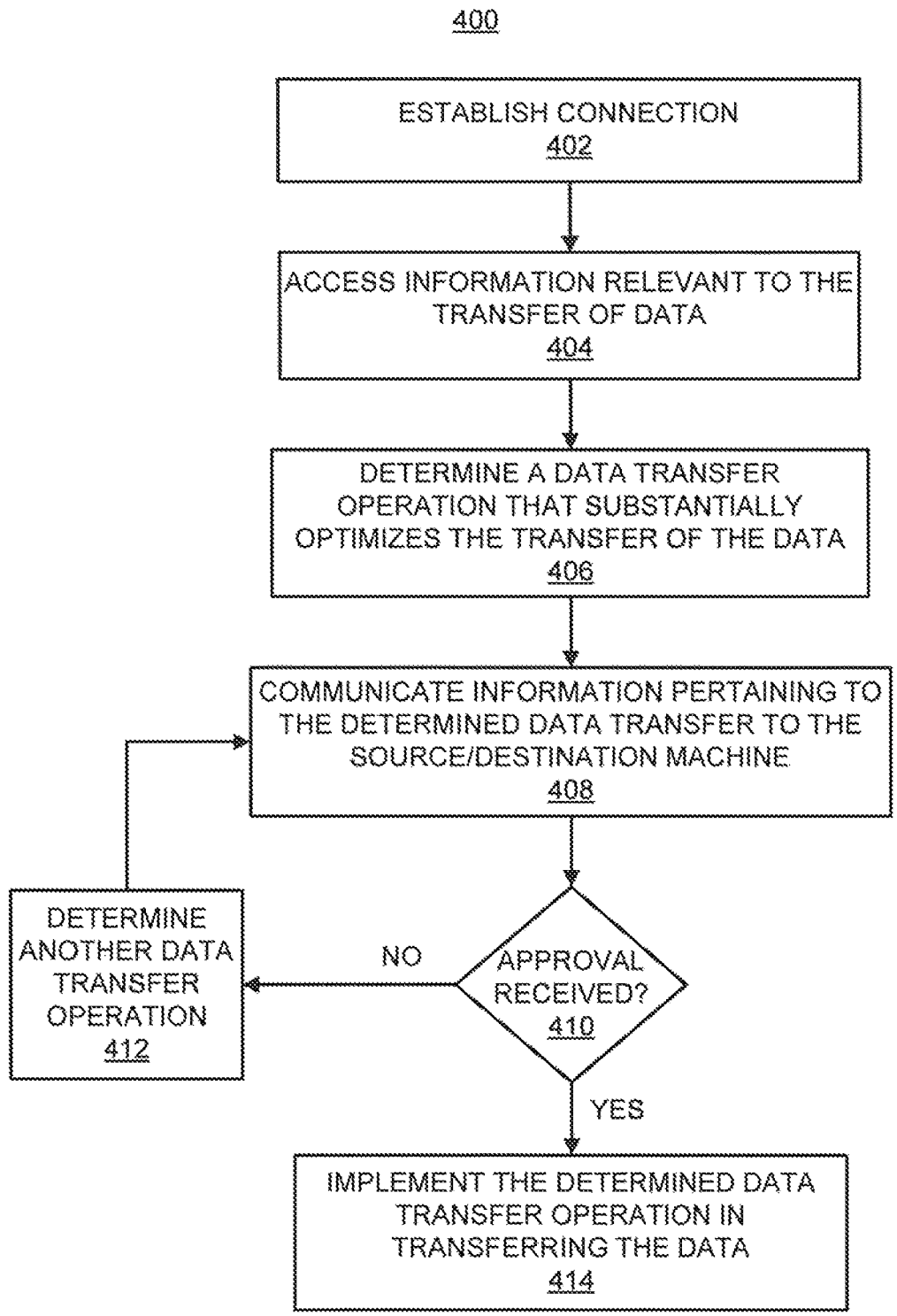

Various manners in which the modules 212-222 of the data transfer manager 210 may be implemented are discussed in greater detail with respect to the methods 300 and 400 depicted in FIGS. 3 and 4. FIGS. 3 and 4, respectively depict flow diagrams of methods 300, 400 for managing transfer of data from a source machine cluster to a destination machine cluster, according to an example of the present disclosure. It should be apparent to those of ordinary skill in the art that the methods 300 and 400 represent generalized illustrations and that other operations may be added or existing operations may be removed, modified or rearranged without departing from the scopes of the methods 300 and 400. Although particular reference is made to the data transfer manager 210 depicted in FIG. 2 as comprising an apparatus and/or a set of machine readable instructions that may perform the operations described in the methods 300 and 400, it should be understood that differently configured apparatuses and/or machine readable instructions may perform the methods 300 and 400 without departing from the scopes of the methods 300 and 400. The method 400 is related to the method 300 in that the method 400 includes operations in addition to those included in the method 300. Thus, the method 400 is to be construed as including all of the features discussed below with respect to the method 300.

Generally speaking, the methods 300 and 400 may separately be implemented to manage transfer of data from a source machine cluster to a destination machine cluster. In addition, the methods 300 and 400 may be implemented to manage the transfer of the data, such that, the data is transferred in a substantially optimized manner, as discussed above. In one regard, the methods 300 and 400 may be implemented following receipt of an instruction to transfer data from a source machine cluster to a destination machine cluster. The instruction may include identification of the machines in the source machine cluster and the machines in the destination machine cluster. The instruction may also include various information relevant to the transfer of the data from the machine(s) in the source machine cluster to the machine(s) in the destination machine cluster.

The source machine cluster may comprise a single machine or a plurality of machines. Likewise, the destination machine cluster may comprise a single machine or a plurality of machines. In addition, the source machine cluster may comprise the same or a different number of machines than the destination machine cluster. According to an example, the methods 300, 400 are implemented in a source machine of the source cluster of machines. In another example, the methods 300, 400 are implemented in a destination machine of the destination cluster of machines. In a further example, the methods 300, 400 are implemented in a machine other than the machines in the source and destination clusters.

With reference first to FIG. 3, at block 302, information relevant to the transfer of data from the source machine cluster to the destination machine cluster is accessed, for instance, by the information accessing module 214. The information relevant to the transfer of the data may include, for instance, at least one of the number of machines in the source cluster of machines from which the data is to be transferred, the number of machines in the destination cluster of machines to which the data is to be transferred, the locations of the machines in the source machine cluster and the machines in the destination machine cluster in a network, the type of data to be transferred, the size of the data to be transferred, the source machines in which the data is stored, the content of the data, etc.

The information relevant to the transfer of the data may be accessed from any of a number of different entities. In one example, the information relevant to the transfer of the data may be accessed from either or both of a source machine and a destination machine. In this example, the source machine may include information relevant to the source machine(s) in the source machine cluster and the destination machine may include information relevant to the destination machine(s) in the destination machine cluster. In this regard, the source machine may aggregate information from the source machines in the source machine cluster and the destination machine may aggregate information from the destination machines in the destination machine cluster. In another example in which the source machine cluster comprises a plurality of source machines, the information relevant to the transfer of the data may be received from each of the plurality of source machines. Likewise, in an example in which the destination machine cluster comprises a plurality of destination machines, the information relevant to the transfer of the data may be received from each of the plurality of destination machines.

In addition or alternatively, the information relevant to the transfer of the data may be received from a user, either directly from the user or from a memory location in which the user has included the information. As a yet further alternative, the information relevant to the transfer of the data may be collected from the machines 102a-102n, for instance, when the machines are initially implemented, at periodic intervals, manually instructed, etc., and stored in the memory location, from which the information accessing module 214 may access the information.

At block 304, a data transfer Operation that substantially optimizes the transfer of the data is determined based upon the information accessed at block 302, for instance, by the data transfer operation determining module 216. The data transfer operation may be determined through implementation of any of a variety of different types of optimizers on the information relevant to the transfer of the data. For instance, a rule-based optimizer may be implemented that determines the data transfer operation based upon whether the information relevant to the data transfer indicates that predetermined conditions have been met. In this example, the rule-based optimizer may be programmed with instructions that indicate that certain data transfer operations are to be implemented under certain conditions.

As another example, a cost-based optimizer may be implemented that determines the data transfer operation based upon a determination as to which data transformation(s) results in the lowest cost. For instance, the cost based optimizer may run predictive models on various data transfer operation scenarios, determine costs associated with each of the data transfer operation scenarios, and may identify the data transfer operation scenario that results in the lowest cost to transfer the data. The cost in this example may comprise any of, for instance, resource utilization, energy utilization, bandwidth consumption, etc.

As a further example, a machine-learning optimizer that employs historical information to determine the data transfer operation may be implemented. In this example, the machine-learning optimizer may take as inputs various historical information pertaining to the transfer of data among the machines 102a-102n and may use the historical information to determine, based upon the information relevant to the current transfer of data, the data transfer operation that substantially optimizes the current transfer of the data. Any of a number of suitable machine-learning optimizers may be employed in this example.

Regardless of the type of optimizer implemented, any of a number of various types of data transfer operations may be employed to substantially optimize the transfer of the data. In addition, various combinations of types of data transfer operations may be employed to substantially optimize the transfer of the data. The data transfer operations may comprise transformations of the data itself and/or transformations of the manner in which the data is transferred.

As an example, a determination may be made that splitting or segmenting the data to be transferred may substantially optimize the transfer of the data. In this example, the data to be transferred from the source machine cluster may be segmented with regard to the destination machine cluster. By way of particular example, consider a scenario in which data from four source machines 102a-102d are to be transferred to three destination Machines 102f-102h, with each of the four source machines 102a-102d containing 1 TB of data to be transferred. In this example, if the data is not split or segmented, then one of the destination machines 102g must accept data from two of the source machines 102b and 102c. As such, the destination machine 102g must accept 2 TB of data. Because the data transfer is as slow as the slowest machine, the amount of time required to complete the transfer is the amount of time that the destination machine 102g requires to process the 2 TB of data. However, by segmenting the data to be transferred from the source machines 102a-102d from four segments to three segments such that each of the source machines 102a-102d tranfers 0.33 TB of data to each of the destination machines 102f-102h and each of the destination machines 102f-102h has to process 1.33 TB, an approximately 33% improvement in the amount of time required to transfer the data may be realized.

In another example, a determination may be made that application of a particular type of encoding and/or compression scheme on the data to be transferred may substantially optimize the transfer of the data. In this example, the selection of the particular type of encoding and/or compression scheme to apply on the data to be transferred may be based upon statistics for the data to be transferred, for instance, to substantially minimize the amount of data (e.g., bytes) to be sent over a network. The statistics may comprise, for instance, whether the data is mostly composed of integers, strings of data, repeated information, etc. As another example, the selection of the encoding and/or compression scheme may be based upon the actual contents of the data. For instance, if the data contains content that is repeated a number of times, a compression scheme may be employed that substantially reduces the amount of data being transferred. By way of example, the repeated information may be compressed through, a compression scheme that identifies the repeated information and, the number of times that the information is repeated instead of transferring each copy of the repeated information.

Generally speaking, different data types are known to have better compression results when compressed using different encoding schemes. For instance, deltaval encoding is generally known as being applicable to integers, but is not applicable to strings. As another example, run-length encoding is generally known as an encoding scheme that is applicable to most data types. Accordingly, selection of the particular type of encoding/compression scheme to be applied on the data may significantly affect the size of the data to be transferred.

In a further example, a determination may be made that re-ordering the order in which data is stored may substantially optimize the transfer of the data. For instance, data may be stored in a particular order based upon the values contained within each record. By re-ordering the data prior to transfer of the data, the data may be transferred in a more efficient manner. For instance, re-ordering the data may improve compression by reducing, the number of bytes that need to be transferred over the network. In addition, or alternatively, the data may be stored in a different sort order on the destination machine. In this regard, the data may be ordered on the source machine and sent to the destination machine or the data may be received on the destination machine and sorted. The determination of whether to perform the ordering on the source machine or the sorting on the destination machine may be made based upon a determination as to which of the source machine and the destination machine has the better performing CPU (and better I/O, if an external sort is performed).

In a yet further example, a determination may be made as to whether converting the data, for instance, to a different format, may substantially optimize the transfer of the data. This determination may be made, for instance, when the source machine cluster employs a different database product or a different database version than the destination machine cluster. Thus, for instance, a determination may be made to convert the data at the source machine cluster prior to transferring the data to the destination machine cluster. In another example, a determination may be made to transfer the data to the destination machine cluster and to convert the data following the transfer. Various factors may be used to make the determination as to whether to convert the data prior to or after the transfer. The various factors may include, for instance, resources available on the source machines and the destination machines, which format is more compact, which of the source machines and the destination machines comprises faster central processing units, etc.

By way of particular example, consider a scenario in which data is to be transferred from a first database product that partitions data physically into equal sizes in bytes to a second database product that segments data logically. The second database product hashes a few columns and assigns it to a machine based on the hash value. In addition, consider a table in the second database product (userid, age, address) and that the table is segmented by the hash(userid). In this example, this table is to be transferred to a destination machine running the first database product to a file sorted by userid. Although each segment in the second database product may be sorted, there may not be a global sort order among the segments. As such, there are two options to transfer the data. Option one is to transfer all of the segments of the data in parallel to the destination machine running the first database product and then to sort the data in the destination machine. Option two is to partition the data and to transfer each partition in parallel, in which each partition may be sorted in parallel. The selection of which option to implement may be based upon any of a plurality of factors, such as whether option one requires an external sort or merge of data across the network, whether each partition may be made sufficiently small to be sorted in memory, whether in option two, all of the partitions may be concatenated easily or are easy to use after the transfer, etc.

According to a further example, in addition to determining a transformation for the data, a layout of the transfer of data that substantially optimizes the transfer of data may also be determined based upon, the information relevant to the transfer of data. Particularly, for instance, the known locations of the machines in the source machine cluster and the machines in the destination machine cluster in a network may be used to determine, for instance, which of the source machines are to transfer data to which of the destination machines. By way of example, the selection of which of the destination machines are to receive data from which of the source machines may be based upon the distances, for instance, the number of hops required to transfer data, between the destination machines and the source machines. More particularly, for instance, the destination machines may be paired with respective source machines in a manner such that the parings substantially minimize the number of hops required to transfer the data.

At block 306, the data transfer operation determined at block 304 is implemented in transferring the data from the source machine cluster to the destination machine cluster, for instance, by the data transfer operation implementation module 218. In addition, the data may be transferred at block 306, for instance, by the transferring module 222. Although the data transfer operation may be implemented concurrently with the transfer of the data, in other examples, the data transfer operation may be implemented prior to transfer of the data.

As discussed above, the method 300 may be implemented by a source machine of the source machine cluster, a destination machine on the destination machine cluster, or a machine outside of either cluster. In an example in which the method 300 is implemented by a source machine of the source machine cluster, the source machine may implement the determined data transfer operation in transferring the data to the destination machine cluster. In another example in which the method 300 is implemented by a destination machine of the destination machine cluster, the destination machine may communicate an instruction to a source machine to implement the determined data transfer operation in transferring the data. In a further example in which the method 300 is implemented by a machine other than the machines in the source and destination machine clusters, the machine may communicate an instruction to a source machine to implement the determined data transfer operation in transferring the data.

Turning now to FIG. 4, at block 402, a connection is established between a source machine of a source machine cluster and a destination machine of a destination machine cluster, for instance, by the input/output module 212. According to an example, the source machine and the destination machine implement protocols to enable long-lived connections to be established between each other, for instance, to enable the data to be transferred over the connection. In addition, the source machine and the destination machine implement protocols to enable the source machine and the destination machine to be authenticated by each other.

At block 404, information relevant to the transfer of data from the source machine cluster to the destination machine cluster is accessed, for instance, by the information accessing module 214. In addition, at block 406, a data transfer operation that substantially optimizes the transfer of the data is determined based upon the information accessed at block 404, for instance, by the data transfer operation determining module 216. The descriptions provided with respect to blocks 302 and 304 in FIG. 3 are applicable to the respective operations performed at blocks 404 and 406.

At block 408, information pertaining to the determined data transfer operation is communicated to the source/destination machine, for instance, by the data transfer approval accessing module 226. Particularly, in the event that the method 400 is performed at a source machine, the information pertaining to the determined data transfer operation is communicated to the destination machine from the source machine. However, in the event that, the method 400 is performed at a destination machine, the information pertaining to the determined data transfer operation is communicated to the source machine from the destination machine. Alternatively, in the event that the method 400 is performed at a machine other than the source machine or the destination machine, the information pertaining to the determined data transfer operation is communicated to both the source machine and the destination machine.

At block 410, a determination is made as to whether approval for the determined data transfer operation has been received, for instance, by the data transfer approval accessing module 220. Particularly, the source machine and/or the destination machine that received the information pertaining to the data transfer operation may make a determination as to whether the determined data transfer operation is feasible and/or compatible with their machines and infrastructures. For instance, a determination may be made that the data transfer operation requires that the destination machine allocate an amount of bandwidth that the destination machine is unable to meet, and thus, the destination machine may reject the determined data transfer operation.

In response to a determination that approval regarding the determined data transfer operation has not been received and/or that the determined data transfer operation has been denied, at block 412, another data transfer operation is determined, for instance, by the data transfer operation determining module 216. In this regard, a data transfer operation other than the previously determined data transfer operation may be determined, as discussed above with respect to block 406. In addition, blocks 408 and 410 may be repeated to determine if the another data transfer operation is approved. Moreover, blocks 408-412 may be repeated until an approved data transfer operation has been determined. However, the method 400 may end after a predetermined number of iterations of blocks 408-412 have been performed and/or after a predetermined amount of time has elapsed before an approved data transfer operation is determined. The predetermined number of iterations and/or the predetermined amount of time, may be defined in any suitable manner. For instance, the predetermined number of iterations and/or the predetermined amount of time may be selected to substantially prevent delay caused by implementation of the method 400 from significantly affecting the time required to perform the transfer of the data. In this instance, the transfer of the data may be performed according to a standard procedure.

In response to a determination at block 410 that approval regarding a data transfer operation has been received, at block 414, the data transfer operation determined at block 406 or at block 412 is implemented in transferring the data, for instance, by, the data transfer operation implementation module 218. The descriptions provided with respect to block 306 in FIG. 3 are applicable to the operations performed at block 414.

According to an example, at block 414, multiple copies of the data are transferred from, a plurality of machines in the source machine cluster to a plurality of destination machines in the destination machine cluster. In this example, the multiple: copies of the data may be transferred for fault tolerance purposes. Generally speaking, a destination machine may contain instructions to make multiple copies of data received from a source machine and to distribute those copies onto other destination machines for fault tolerance purposes. In this example, however, the destination machine may instead be instructed to abstain from making and distributing the copies, but instead, the multiple copies of the data may be transferred to the multiple destination machines, for instance, in instances where the determined data transfer operation indicates that such transfer would be faster.

According to a further example, if both the source machine clusters and the destination machine clusters have the same number of machines, data segmentation and disk encoding/compression is being implemented, and all or a subset of columns are being transferred, then the files on disk may be transferred as is without converting the files from the file format to executable format. In other words, in instances where the data layout on both a source machine and a destination machine is the same, then the files may be transferred as is. In these instances, therefore no CPU and minimal I/O is used to decompress and decode the data. As such, for instance, these resources may be kept free for other operations.

Some or all of the operations set forth in the methods 300 and 400 may be contained as a utility, program, or subprogram, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 5:
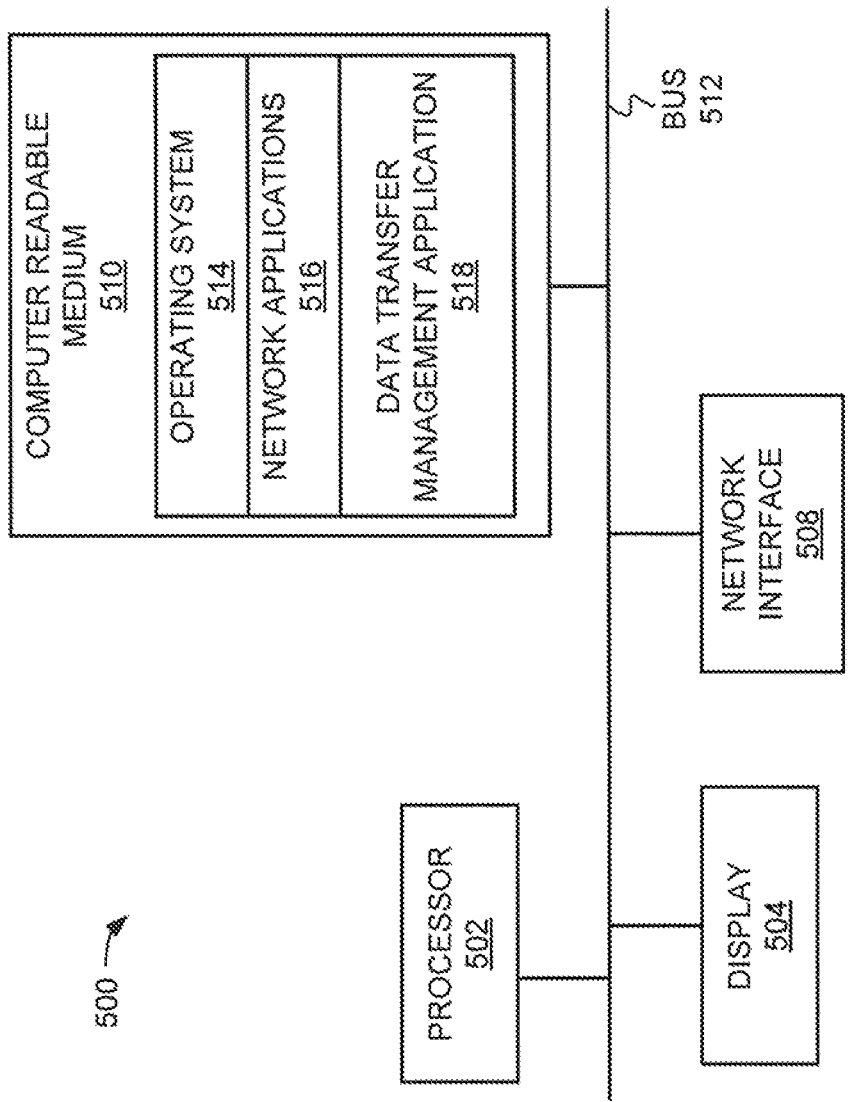
FIG. 5 illustrates a schematic representation of a computing device, which may be employed to perform various functions of a machine depicted in FIGS. 1 and 2, according to an example of the present disclosure.

Turning now to FIG. 5, there is shown a schematic representation of a computing device 500, which may be employed to perform various functions of the machines 102a-102n, 200 respectively depicted in FIGS. 1 and 2, according to an example. The computing device 500 includes a processor 502, such as but not limited to a central processing unit; a display device 504, such as but not limited to a monitor; a network interface 508, such as but not limited to a Local Area Network LAN, a wireless 802.11x LAN, a 3G mobile WAN or a WiMax WAN; and a computer-readable medium 510. Each of these components is operatively coupled to a bus 512. For example, the bus 512 may be an EISA, a PCI, a USB, a FireWire, a NuBus, or a PDS.

The computer readable medium 510 comprises, any suitable medium that participates in providing instructions to the processor 502 for execution. For example, the computer readable medium 510 may be non-volatile media, such as memory. The computer-readable medium 510 may also store an operating system 514, such as but not limited to Mac OS, MS Windows, Unix, or Linux; network applications 516; and a data transfer management application 518. The operating system 514 may be multi-user, multiprocessing, multitasking, multithreading, real-time and the like. The operating system 514 may also perform basic tasks such as but not limited to recognizing input from input devices, such as but not limited to a keyboard or a keypad; sending output to the display 504; keeping track of files and directories on medium 510; controlling peripheral devices, such as but not limited to disk drives, printers, image capture device; and managing traffic on the bus 512. The network applications 516 include various components for, establishing and maintaining network connections, such as but not limited to machine readable instructions for implementing communication protocols including TCP/IP, HTTP, Ethernet, USB, and FireWire.

The data transfer management application 518 provides various components for managing transfer of data from a source machine cluster to a destination machine cluster as discussed above with respect to the methods 300 and 400 in FIGS. 3 and 4. The data transfer management application 518 may thus comprise the input/output module 212, the information accessing module 214, the data transfer operation determining module 216, the data transfer operation implementation module 218, the data transfer approval accessing module 220, and the transferring module 222. In this regard, the data transfer management application 518 may include modules for performing the methods 300 and/or 400.

In certain examples, some or all of the processes performed by the application 518 may be integrated into the operating system 514. In certain examples, the processes may be at least partially implemented in digital electronic circuitry, or in computer hardware, machine readable instructions (including firmware and software); or in any combination thereof, as also discussed above.

What has been described and illustrated herein are examples of the disclosure along with some variations. The terms, descriptions and figures used herein are set forth by way of illustration only and are not meant as limitations: Many variations are possible within the scope of the disclosure, which is intended to be defined by the following claims—and their equivalents—in which all terms are meant in their broadest reasonable sense unless otherwise indicated.

What is claimed is:

1. A method for managing transfer of data from a source machine cluster to a destination machine cluster, said method comprising:
   identifying data stored in a plurality of source machines in the source machine cluster to be transferred to a plurality of destination machines in the destination machine cluster during a common data transfer operation;
   accessing information relevant to the transfer of the identified data from the plurality of source machines to the plurality of destination machines, wherein the information relevant to the transfer of the identified data comprises at least one of: the number of source machines from which the identified data is to be transferred, the number of destination machines to which the identified data is to be transferred, the locations of the source machines and the destination machines in a network, the type of the identified data to be transferred from the source machines, the size of the identified data to be transferred, the source machines in which the identified data is stored, and the content of the identified data;
   determining a data transfer operation that substantially optimizes the transfer of the identified data from the plurality of source machines to the plurality of destination machines based upon the accessed information; and
   implementing the determined data transfer operation in transferring the identified data from the plurality of source machines to the plurality of destination machines, wherein the plurality of destination machines are final destinations at which the identified data transferred from the plurality of source machines are stored.

2. The method according to claim 1, further comprising:
   establishing a connection between a source machine of the source machine cluster and a destination machine of the destination machine cluster; and
   wherein accessing information relevant to the transfer of the identified data further comprises exchanging the information relevant to the transfer of the identified data from the source machine to the destination machine.

3. The method according to claim 1, wherein accessing information relevant to the transfer of the identified data further comprises accessing the information from a user.

4. The method according to claim 1, wherein determining the data transfer operation further comprises determining the data transfer operation in a source machine of the source machine cluster, said method further comprising:
   communicating information pertaining to the determined data transfer operation to a destination machine of the destination machine cluster;
   determining whether an indication of data transfer operation approval is received from the destination machine responsive to the communicated information; and
   wherein implementing the determined data transfer operation in transferring the identified data further comprises implementing the determined data transfer operation in transferring the identified data in response to receipt of the indication of data transfer operation approval from the destination machine.

5. The method according to claim 4, further comprising:
   in response to a determination that the indication of data transfer operation approval is not received from the destination machine, determining another transfer operation for the identified data.

6. The method according to claim 1, wherein determining the data transfer operation further comprises determining the data transfer operation in a destination machine of the destination machine cluster, said method further comprising:
   communicating information pertaining to the determined data transfer operation to a source machine of the source machine cluster;
   determining whether an indication of data transfer operation approval is received from the source machine response to the communicated information;
   wherein implementing the determined data transfer operation in transferring the identified data further comprises implementing the determined data transfer operation in transferring the identified data in response to receipt of the indication of data transfer operation approval from the source machine; and
   in response to a determination that the indication of data transfer operation approval is not received from the source machine, determining another data transfer operation that substantially optimizes the transfer of the identified data based upon the accessed information.

7. The method according to claim 1, wherein determining the data transfer operation further comprises determining at least one of a manner in which the identified data is to be split, a manner in which a sort order of the identified data is to be modified, a manner in which the identified data is to be compressed, a manner in which the identified data is to be encoded, and a manner in which the identified data is to be transferred from the source machine cluster and the destination machine cluster.

8. The method according to claim 1, wherein determining the data transfer operation further comprises implementing at least one of a rule-based optimizer, a cost-based optimizer, and a machine-learning optimizer that employs historical data to determine the data transfer operation that substantially optimizes the transfer of the identified data based upon the accessed information.

9. The method according to claim 1, wherein implementing the determined data transfer operation in transferring the identified data further comprises implementing the determined data transfer operation to transfer multiple copies of the identified data from the plurality of source machines to the plurality of destination.

10. A manager for managing transfer of data from a source machine cluster to a destination machine cluster, said manager comprising:
    a memory on which is stored at least one module to,
       identify data stored in a plurality of source machines in the source machine cluster to be transferred to a plurality of destination machines in the destination machine cluster during a common data transfer operation;
       access information relevant to the transfer of the identified data from the plurality of source machines to the plurality of destination machines, wherein the information relevant to the transfer of the identified data comprises at least one of: the number of source machines from which the identified data is to be transferred, the number of destination machines to which the identified data is to be transferred, the locations of the source machines and the destination machines in a network, the type of the identified data to be transferred from the source machines, the size of the identified data to be transferred, the source machines in which the identified data is stored, and the content of the identified data;

determine a data transfer operation that substantially optimizes the transfer of the identified data from the plurality of source machines to the plurality of destination machines based upon the accessed information;

implement the determined data transfer operation to transfer the identified data from the plurality of source machines to the plurality of destination machines, wherein the plurality of destination machines are final destinations at which the identified data transferred from the plurality of source machines are stored; and a processor to implement the at least one module.

11. The manager according to claim 10, wherein the at least one module is further to:

establish a connection between a source machine of the source machine cluster and a destination machine of the destination machine cluster;

exchange the information relevant to the transfer of the identified data between the source machine and the destination machine; and transfer the identified data from the source machine cluster to the destination machine cluster.

12. The manager according to claim 10, wherein the at least one module is further to:

request for approval of the determined data transfer operation;

determine another data transfer operation if approval for the determined data transfer operation is not received.

13. The manager according to claim 10, wherein the at least one module is further to:

implement the determined data transfer operation to transfer multiple copies of the identified data from a plurality of source machines of the source machine cluster to a plurality of destination machines in the destination machine cluster.

14. A non-transitory computer readable storage medium on which is stored machine readable instructions that when executed by a processor, implement a method for managing transfer of data from a source machine cluster to a destination machine cluster, said machine readable instructions comprising code to:

identify data stored in a plurality of source machines in the source machine cluster to be transferred to a plurality of destination machines in the destination machine cluster during a common data transfer operation;

access information relevant to the transfer of the identified data from the plurality of source machines to the plurality of destination machines, wherein the information relevant to the transfer of the identified data comprises at least one of: the number of source machines from which the identified data is to be transferred, the number of destination machines to which the identified data is to be transferred, the locations of the source machines and the destination machines in a network, the type of the identified data to be transferred from the source machines, the size of the identified data to be transferred, the source machines in which the identified data is stored, and the content of the identified data;

determine a data transfer operation that substantially optimizes the transfer of the identified data from the plurality of source machines to the plurality of destination machines based upon the accessed information; and implement the determined data transfer operation in transferring the identified data from the plurality of source machines to the plurality of destination machines, wherein the plurality of destination machines are final destinations at which the identified data transferred from the plurality of source machines are stored.

\* \* \* \* \*